United States Patent Office 3,550,303
Patented Dec. 29, 1970

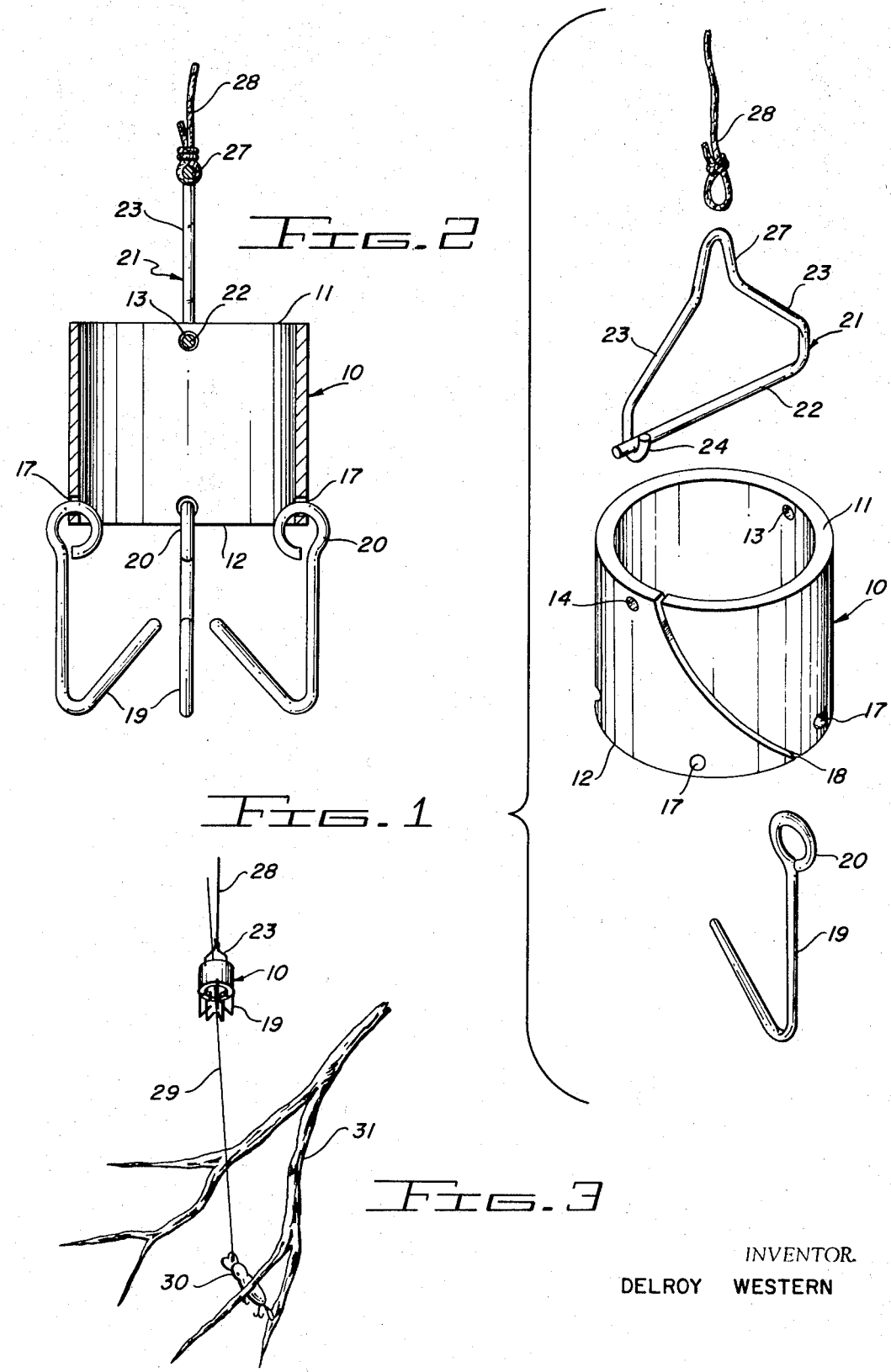

3,550,303
FISHING LURE RETRIEVER
Delroy Western, 2801 West Maryland Ave.,
Phoenix, Ariz. 85017
Filed May 27, 1968, Ser. No. 732,196
Int. Cl. A01k 97/00
U.S. Cl. 43—17.2                           1 Claim

ABSTRACT OF THE DISCLOSURE

A fishing lure retriever having a cylindrical body which is guided to the submerged entangled lure by the fishing line. The body dislodges the lure and a plurality of hooks along the lower edge thereof grasp the lure. The retriever is manipulated by an attached line.

BACKGROUND OF THE INVENTION

This invention relates to fishing gear.

More particularly, the invention concerns a device for retrieving submerged entangled fishing lures.

Sport fishing is a hobby that attracts millions of Americans. The majority of these fisherman regularly pursue the so-called warm water fishes as typified by the bass and pike species.

Even the novice fisherman quickly learns where to seek these species. The characteristic habitat is best summarized by P. Allen Parsons is his "Complete Book of Fresh Water Fishing," Outdoor Life, Harper and Row, 1963: ". . . look for largemouths (bass) where good cover is close to natural food such as openings among the weeds and lily pads, heaps of sunken brush, logs, and rocks large enough to give them shelter." Conventionally, these fishes are enticed with artificial lures. The fisherman anticipating the greatest degree of success is the one who will cast and work his lure in among the bramble noted above. In so doing, lures are frequently entangled.

Inasmuch as fishing lures are relatively expensive, it is the fisherman's desire to retrieve the entangled lure. This usually entails rowing the boat back and forth over the point of entanglement to pull this way and that over the lure in attempts to dislodge and free it. Only minimal success is normally achieved. Fishing is best usually only during short periods of the day, and much valuable time is wasted in futile attempts to retrieve entangled lures. Fish are temperamental in their feeding habits and usually prefer a specific type of lure on any given occasion. If the fisherman's favorite lure for the day is enangled and cannot be retrieved, the chances of continued success are substantially reduced.

It would be highly advantageous, therefrom, to provide a compact fishing lure retriever with which the fisherman could effectively and conveniently retrieve entangled fishing lures.

SUMMARY OF THE INVENTION

Accordingly, it is a principal object of the present invention to provide a device for retrieving entangled fishing lures.

It is a further object of the present invention to provide a fishing lure retriever that is compact and easily carried within the fisherman's tackle box.

Yet another object of the persent invention is to provide a fishing lure retriever of the above type which is convenient to use and highly reliable in retrieving submerged, enangled fishing lures.

Yet still another object of the invention is to provide a fishing lure retriever which is simply constructed and relatively inexpensive to manufacture.

Briefly, to accomplish the desired objectives of my present invention, I first provide a generally cylindrical body having a slit extending along one side to pass the fishing lure line there between. A plurality of inwardly directed hooks depend from the lower edge of the cylindrical body. Each hook is movably attached in such a manner as to permit radial and tangential movement relative to the body but prohibited from pivotal rotation. A detachable wire clip, having one segment passing through a pair of diametrically opposed holes near the upper edge of the body and a segment having an upwardly extending V portion bent near the center thereof, accommodates a line from which the fishing lure retriever is suspended.

In operation, the fishing lure line is passed through the slit in the side of the body to guide the retriever to the entangled lure. As the retriever slides down the fishing lure line, it will strike the lure with generally enough force to dislodge it. The hooks than randomly grasp the lure whereupon the retriever and the lure are recovered by the line from which the retriever is suspended. The retriever and the line are of sufficient strength to lift brush and other submerged debris when retrieving severely entangled lures.

BRIEF DESCRIPTION OF THE DRAWINGS

The above stated objects and other further and more specific objects and advantages of the present invention will become apparent to those skilled in the art from the following detailed description of the preferred embodiment thereof taken in conjunction with the drawings, in which:

FIG. 1 is an exploded perspective view of the present invention particularly detailing the component elements thereof;

FIG. 2 is an elevational view, in section, showing the assembled elements of the device of FIG. 1; and, FIG. 3 is a perspective view depicting the device of the present invention as it would appear during employment to retrieve an entangled lure.

DETAILED DESCRIPTION OF THE PREFERRED EMBODIMENT

Turning now to the drawings in which the same reference characters indicate corresponding elements throughout the several views, FIG. 1 is an exploded perspective view of a fishing lure retriever constructed in accordance with the teachings of the present invention chosen for purposes of illustrating and showing the cylindrical body, generally designated by the reference character 10, having an upper edge 11 and a lower edge 12. A pair of diametrically opposed holes 13 and 14 extend through the cylindrical body 10 near the upper edge 11. A plurality of spaced holes 17 extend radially through the cylinder wall near the lower edge 12. A slit 18 extends through the cylinder wall diagonally from the upper edge 11 to the lower edge 12.

A rigid wire hook 19 is provided with an eye 20 at the upper end of the hook shank to engage through the hole 17. Although not herein illustrated, it is understood that a series of hooks 19 are employed, one depending from each hole 17. A wire clip generally designated by the reference character 21 has one segment 22 capable of passing through the holes 13 and 14 and a second segment 23 which passes over the top of the body 10 substantially parallel to the first segment 22. A hook end 24 of the segment 23 engages near the end of the first segment 22. An upwardly directed V shaped portion 27 near the center of the segment 23 provides a locational attachment for the line 28.

FIG. 2 shows the assembled elements of the fishing lure retriever of FIG. 1. Particularly noted in this view are the inwardly directed hooks 19 having the eyes 20 engaged through the holes 17 and depending therefrom. For purposes of clarity in drawing, this view illustrates a 4-hook arrangement, however, a preferred embodiment utilizes 5 hooks and more or less hooks may be desirable under any given conditions.

FIG. 3 depicts the fishing lure retriever as it might appear in operation. The fishing lure line 29 has been passed through the slit 18 and now guides the body 10 towards the lure 30 entangled in submerged brush 31. It is noted from this view that the hooks 19 will swing outwardly to allow the body 10, preferably constructed of a heavy metal, to strike the lure 30 and push it downwardly. Free of the brush 31 as the retriever is recovered by the line 28, the hooks 19 will swing inwardly and randomly grasp the lure 30. If the lure 30 is not dislodged from the brush 31 with the initial or a repeated impact, the hooks 19 will grasp that portion of the brush 31 adjacent the lure 30, whereupon a portion of the brush may be broken free and the lure still recovered.

It will be readily understood by those skilled in the art that proper spring tempering and biasing of the wire clip 21 will permit proper engagement between the segment 22 and the hook 24, thus rendering the clip 21 readily detachable with the body 10. In those applications in which obstinate entanglements demand severe usage, the fishing lure line 29 may have a tendency to withdraw through the slit 18. In such cases, the hook 24 may be disengaged and the segment 22 withdrawn slightly so that the fishing line may be passed across the body 10 and restrained from the slit 18 by the wire clip 21. An alternate embodiment utilizing an irregular slit, will also accomplish the desired feature of retaining the fishing lure line within the body.

Various changes in the device chosen for purposes of illustration in the drawings will readily occur to persons skilled in the art having regard for the disclosure hereof.

Having fully described the invention and the preferred embodiment thereof in such clear and concise terms as to enable those skilled in the art to understand and practice the same, I claim:

1. A fishing lure retriever for entangled lures, adapted to be guided to the lure by the fishing lure line, and further adapted to dislodge and grasp the lure, said fishing lure retriever comprising:

(a) a generally upright cylindrical body having an upper edge and a lower edge and having a diagonal slit extending along the side thereof between said upper edge and said lower edge and capable of passing a line therebetween;

(b) means for attaching a line secured near the upper edge of said cylindrical body; and, (c) a plurality of inwardly directed hooks pivotably depending from the lower edge of said cylindrical body;

(d) said means for attaching a line comprising a substantially rigid wire having a straight first segment extending diametrically through said cylindrical body near the upper edge thereof; a second segment continuous with one end of said first segment and extending therefrom over the upper edge of and diametrically across said body; said second segment having an upwardly directed V shaped portion near the center thereof and a free-end portion adjacent the other end of said first segment; said free-end provided with a hook means thereon for detachably engaging said other end of said first segment;

(e) said cylindrical body containing two diametrically opposed holes adjacent the upper edge thereof for receiving the ends of said first and second segments of said wire; and (f) said slit being located in said cylindrical body to one side of the diameter line through said diametrically opposed holes;

(g) said cylindrical body containing holes adjacent the lower edge thereof; said hooks having ring-like upper end portions about which said hooks can be swingly pivoted in said last mentioned holes.

References Cited

UNITED STATES PATENTS

| | | | |
|---|---|---|---|
| 3,191,335 | 6/1965 | Sobetzer | 43—17.2 |
| 2,760,810 | 8/1956 | Smith | 294—66 |
| 3,172,225 | 3/1965 | Zoss | 43—17.2 |
| 3,156,064 | 11/1964 | Czirr | 43—17.2 |
| 2,793,457 | 5/1957 | Gaynes | 43—17.2 |

FOREIGN PATENTS

| | | | |
|---|---|---|---|
| 899,445 | 10/1943 | France | 43—17.2 |

RICHARD AEGERTER, Primary Examiner

R. S. GAITHER, Assistant Examiner

U.S. Cl. X.R.

294—66